D. C. SPENCE.
PNEUMATIC MOTOR.
APPLICATION FILED AUG. 10, 1915.

1,186,699.

Patented June 13, 1916.

Inventor,
David C. Spence,
By Francis M. Wright,
Attorney

UNITED STATES PATENT OFFICE.

DAVID C. SPENCE, OF SAN MATEO, CALIFORNIA.

PNEUMATIC MOTOR.

1,186,699.　　　　　Specification of Letters Patent.　　Patented June 13, 1916.

Application filed August 10, 1915. Serial No. 44,692.

*To all whom it may concern:*

Be it known that I, DAVID C. SPENCE, a citizen of the United States, residing at San Mateo, in the county of San Mateo and State of California, have invented new and useful Improvements in Pneumatic Motors, of which the following is a specification.

My invention relates to improvements in pneumatic motors, and especially in those which operate by suction, and has for its object to avoid the necessity of using slide valves, which slide valves are the cause of friction, which friction increases with wear, and thus, by eliminating the slide valves, to economize in power, and also reduce the space required for the motor.

Figure 1:
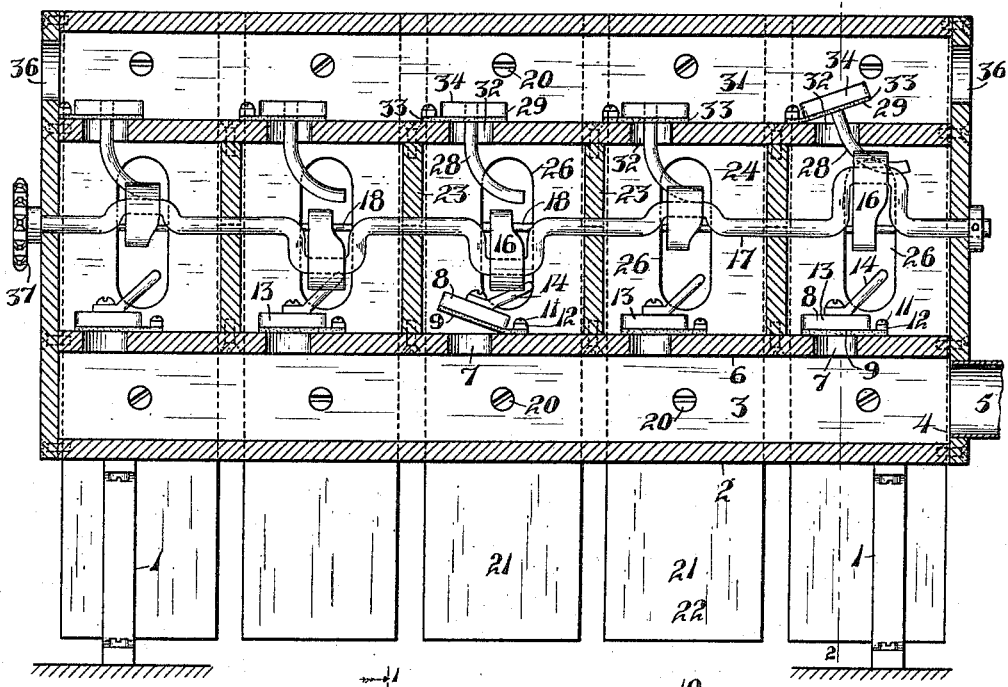
Figure 2:
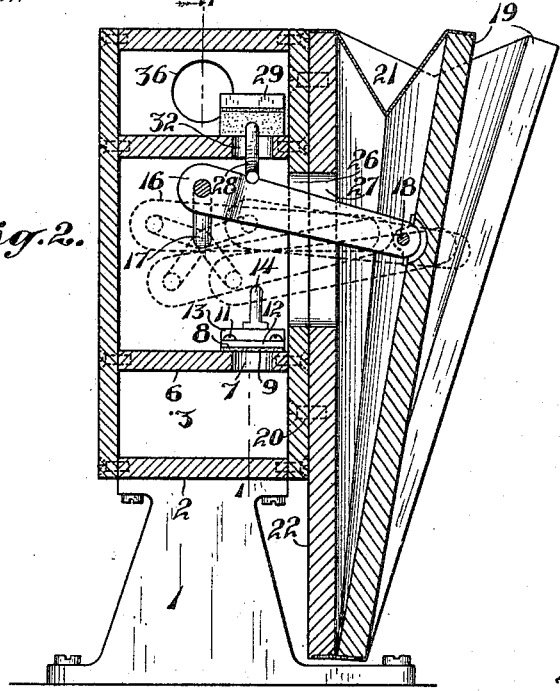

In the accompanying drawing, Figure 1 is a longitudinal section of my improved motor on the line 1—1 of Fig. 2; Fig. 2 is a cross section thereof on the line 2—2 of Fig. 1.

Referring to the drawing, upon suitable standards 1 is supported the base 2 of a suction chamber 3 communicating at one end, as shown at 4, with a conduit 5 leading to a suction-producing device, not shown, of any suitable character, such as a number of bellows operated by the feet of the operator or by an electric motor. 6 indicates the top wall of said suction chamber in which are a series of ports 7 closed by flap valves 8, each comprising a piece 9 of leather or other suitable flexible material closing a port 7 and secured to the top 6 by screws 11 screwed through small strips 12 of wood or other suitable material on said leather and into said top 6. On each piece 9 of leather is secured a weighted plate 13, to which is secured a bent lever or arm 14, extending obliquely upward from said plate into the path of the outer end of one of a series of links 16, through which ends extend the cranks of a crank shaft 17. The other ends of said links are pivotally connected by pins 18 with the movable leaves 19 of bellows 21, of which the stationary leaves 22 are secured by means of screws 20 to a vertical wall of the suction chamber. The crank shaft 17 has bearings in partitions 23 in a shaft chamber 24. Each link extends through vertically elongated ports 26, 27 registering with each other and formed in a vertical wall of the shaft chamber and the stationary leaf 22 of the bellows, so that the several compartments in the crank shaft chamber communicate respectively with the several bellows. The upper side of each link can engage the lower end of a bent arm 28 depending from a flap valve 29 in a valve chamber 31 and closing a port 32 into the corresponding compartment of the crank shaft chamber, said flap valve comprising a piece 33 of suitable material secured to the bottom of the valve chamber and carrying a weighted plate 34, from which said arm 28 extends through said port. Said valve chamber 31 communicates, as shown at 36, at each end with the atmosphere. The crank shaft is provided at one or both ends, one only being here shown, with means, here shown as a sprocket wheel 37, for transmitting motion to a distant point from the rotary motion of the crank shaft.

The motor operates in the following manner:—The suction chamber 3 being always under exhaust, the suction therein causes air to be drawn through any one of the ports 7, as, for instance, the middle one in Fig. 1, from which the valve 8 is raised, this position of the valve being produced by the engagement of the lower portion of the front end of the link with the arm or lever 14. Thereby, in the case supposed, the middle compartment will also be under exhaust, and the movable leaf of the corresponding bellows is drawn forward by the suction, which produces a turning movement of the crank shaft. At the same time one or more of the cranks of said shaft, as, for instance, the right-hand one in Fig. 1, is in such a position that the movable leaf of the corresponding bellows is moving outward and the link 16 is raising the corresponding valve 29, thereby causing air to be drawn through the upper port 32 into the corresponding compartment of the crank shaft chamber, and through the registering elongated openings 26, 27 into the corresponding bellows, thereby allowing said bellows to expand. It will readily be seen that each crank of the crank shaft operates in this manner, that is, it first, by means of the arm 28, raises the upper valve 29, while the bellows is opening, the lower valve being then closed, thereby admitting air into the bellows, and then, by means of the arm 14, it raises the lower valve while the bellows is collapsing, the upper valve being then closed, thereby permitting air to pass from the bellows into the lower suction chamber and out to the exhaust. In this manner a rotary motion is imparted to said crank shaft from the suction without the use of slide valves and by means of lifting valves only.

It is apparent that the motor can operate by pneumatic pressure equally as well as by suction.

I claim:—

1. In combination, a crank shaft chamber, partitions dividing the same into compartments, bellows communicating with the several compartments, a crank shaft in said chamber, links connected to the cranks of said shaft and to the movable leaves of the bellows, chambers of higher and lower pressure, each compartment also communicating separately with the chambers of higher and lower pressure, lifting valves severally closing said latter communications, and arms extending from all of said valves and adapted to be engaged in succession by parts movable with the crank shaft to open the valves controlling the communications with the chamber of lower pressure when the bellows are collapsing and to open those controlling the communications with the chamber of higher pressure when the bellows are expanding.

2. In combination, a crank shaft chamber, partitions dividing the same into compartments, bellows communicating with the several compartments, a crank shaft in said chamber, links connected to the cranks of said shaft and to the movable leaves of the bellows, and extending through said communications, chambers of higher and lower pressure, each compartment also communicating separately with the chambers of higher and lower pressure, lifting valves severally closing said latter communications, and arms extending from all of said valves and adapted to be engaged in succession by said links to open the valves controlling the communications with the chamber of lower pressure when the bellows are collapsing and to open those controlling the communications with the chamber of higher pressure when the bellows are expanding.

3. In combination, a crank shaft chamber, partitions dividing the same into compartments, bellows communicating with the several compartments, a crank shaft in said chamber, links connected to the cranks of said shaft and to the movable leaves of the bellows, chambers of higher and lower pressure, each compartment also communicating separately with the chambers of higher and lower pressure, lifting valves severally closing said latter communications, and operative connections between all of said valves and the crank shaft to open the valve controlling the communications with the chamber of lower pressure when the bellows are collapsing and to open those controlling the communications with the chamber of higher pressure when the bellows are expanding.

In testimony whereof I have hereunto set my hand in the presence of two subscribing witnesses.

DAVID C. SPENCE.

Witnesses:
FRANCIS M. WRIGHT,
D. B. RICHARDS.

Copies of this patent may be obtained for five cents each, by addressing the "Commissioner of Patents, Washington, D. C."